(12) United States Patent
Bai et al.

(10) Patent No.: US 9,830,396 B2
(45) Date of Patent: Nov. 28, 2017

(54) METHOD AND APPARATUS OF ADAPTIVE SAMPLING FOR VEHICULAR CROWD SENSING APPLICATIONS

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Leonard C. Nieman, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 544 days.

(21) Appl. No.: 14/531,242

(22) Filed: Nov. 3, 2014

(65) Prior Publication Data
US 2016/0124976 A1 May 5, 2016

(51) Int. Cl.
| | | |
|---|---|---|
| *H04W 4/00* | (2009.01) | |
| *G06F 17/30* | (2006.01) | |
| *H04W 4/02* | (2009.01) | |
| *H04L 29/08* | (2006.01) | |
| *H04W 84/18* | (2009.01) | |
| *H04L 12/841* | (2013.01) | |

(52) U.S. Cl.
CPC .......... *G06F 17/3087* (2013.01); *H04L 67/12* (2013.01); *H04W 4/005* (2013.01); *H04W 4/02* (2013.01); *H04W 4/021* (2013.01); *H04L 47/28* (2013.01); *H04L 67/18* (2013.01); *H04W 84/18* (2013.01)

(58) Field of Classification Search
CPC ...... H04N 7/181; H04W 4/005; H04W 4/021; G08G 1/01
See application file for complete search history.

(56) References Cited

U.S. PATENT DOCUMENTS

| | | | | |
|---|---|---|---|---|
| 9,628,359 B1* | 4/2017 | Jain | ...................... | H04L 43/0811 |
| 2009/0042304 A1* | 2/2009 | Anderson | .............. | G01N 33/02 |
| | | | | 436/20 |
| 2013/0103376 A1* | 4/2013 | Gaddam | ................. | H04L 67/26 |
| | | | | 703/13 |
| 2014/0090053 A1* | 3/2014 | Simske | ................. | H04L 63/105 |
| | | | | 726/22 |
| 2014/0303806 A1* | 10/2014 | Bai | ..................... | G01C 21/3697 |
| | | | | 701/1 |

(Continued)

*Primary Examiner* — Jeong S Park
(74) *Attorney, Agent, or Firm* — Quinn IP Law

(57) ABSTRACT

A crowd sensing system includes a central entity and remote entities. The remote entities receive queries from the central entity and transmit data to the central entity in response to the query. The sample data obtained from the queried remote entity is analyzed and an average value for the sample data is determined for a current time interval. The central entity determines whether a difference between the average values for the current time interval and a previous time interval is greater than a predetermined threshold. The central entity increases the number of entities in response to the difference being greater than the predetermined threshold, and decreases the respective number of remote entities sampled in response to the difference being less than the predetermined threshold. The central entity queries a number of remote entities in the plurality of regions equal to the adjusted number of samples identified by the central entity.

20 Claims, 4 Drawing Sheets

(56) References Cited

U.S. PATENT DOCUMENTS

2015/0145995 A1* 5/2015 Shahraray ................ B60R 1/00
            348/148
2016/0042644 A1* 2/2016 Velusamy .............. G08G 1/162
            340/435

* cited by examiner

METHOD AND APPARATUS OF ADAPTIVE SAMPLING FOR VEHICULAR CROWD SENSING APPLICATIONS

BACKGROUND OF INVENTION

An embodiment relates to data retrieval through crowd sensing sampling.

In ad hoc communication networks, vehicles collect and readily transmit data to other vehicles in the network to share information relating to various events occurring in the surrounding area. Such information may include slow traffic, accidents, and weather-related conditions. When each vehicle transmits data, the communication channel may experience congestion due to the limited bandwidth of the communication channel. As a result, the effective data communication rate may be reduced, hindering the transmission of pertinent information to other vehicles.

SUMMARY OF INVENTION

An advantage of an embodiment is the selective adjustment in the number of remote entities queried by a central entity which assists in reducing the data flow over the communication channel. Based on a comparison between the current data and the previous data, a determination may be made as to whether the number of remote entities queried can be increased or decreased. If information between the current data and the previous data is essentially similar, then the number of remote entities queried in the next query may be reduced. If information between the current data and the previous data is essentially different, then the number of remote entities queried in the next query may be increased to verify the accuracy of the data.

An embodiment contemplates a method of adaptively controlling a sampling size for crowd sensing applications. (a) identifying a plurality of geographic regions for obtaining sample data; (b) identifying, by a central entity, a respective number of entities to sample within each geographical region during a current time interval; (c) obtaining sample data from each of the respective entities identified in step (b); (d) determining, by the central entity, a statistical value for the sampled data; (e) determining whether a difference between the statistical value for the current time interval and a statistical value for a previous time interval is greater than by a predetermined threshold; (f) increasing the respective number entities sampled in the region in response to the difference being greater than the predetermined threshold; otherwise, decreasing the respective number of samples identified from the region in response to the difference being less than the predetermined threshold; and (g) repeating steps (b)-(g) utilizing the respective number of entities to sample as identified in step (f).

An embodiment contemplates a crowd sensing system that comprises a central entity including a processor, transmitter, and receiver identifying a plurality of geographic regions for obtaining sample data. A plurality of remote entities located in the plurality of geographical regions. The remote entities include a transmitter and receiver receiving queries from the central entity. The queried remote entities transmitting data to the central entity in response to the query. The central entity identifies a respective number of remote entities within each region to obtain sample data. Sample data is obtained from each of the identified remote entities. The central entity determines a statistical value for the sampled data. The central entity determines whether a difference between the statistical value for the current time interval and a statistical value for a previous time interval is greater than a predetermined threshold. The respective number of sampled entities in the region are increased in response to the difference being greater than the predetermined threshold; otherwise, decreasing the respective number of samples entities identified from the region in response to the difference being less than the predetermined threshold; and wherein the central entity queries a number of remote entities in the plurality of regions equal to the adjusted number of samples identified by the central entity during a next time interval.

DETAILED DESCRIPTION

Figure 1:
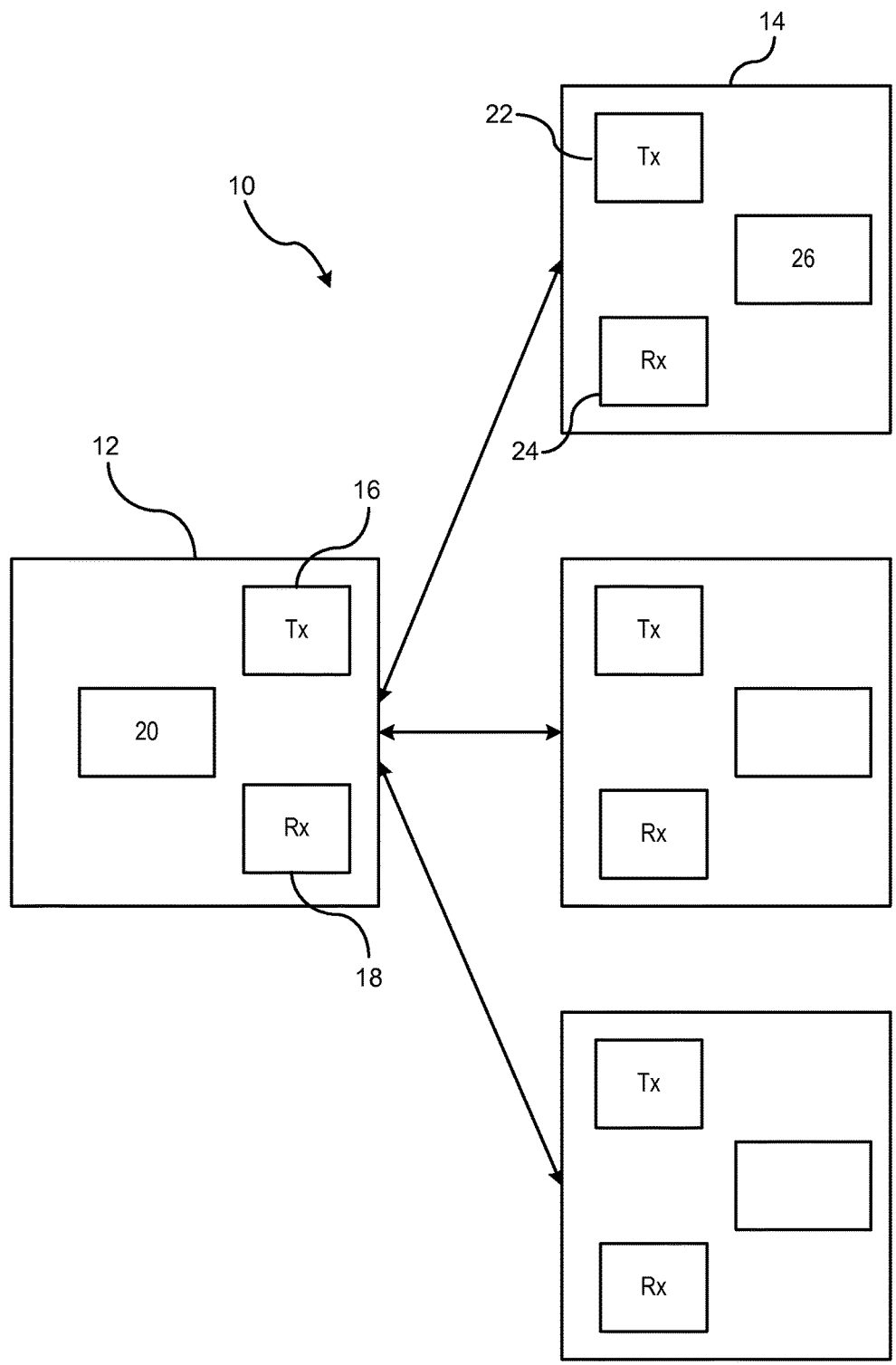
FIG. 1 is a block diagram of a vehicular communication system.

There is shown in FIG. 1, a vehicular communication system 10 where a central entity 12 communicates with remote entities 14 for obtaining queried data by crowd sensing. Crowd sensing is a technique in which information is obtained by soliciting contributions from a large group of entities (e.g., vehicle's traveling in a respective geographical location). Information such as traffic and weather condition is provided to the central entity 12 when queried by remote entities. In crowd sensing, the number of entities that are queried are adaptively controlled by adaptively sampling selected entities for obtaining the requested information. By controlling the number of sampled entities, the local vehicle computational burden is minimized by maintaining a selective number of entities that will provide sufficient data to make an informed decision while minimizing vehicle data bandwidth. The system described herein minimizes computational and resource usage of back office computing devices by the central entity 12 by minimizing the number of remote entities that are selected for transmitting the data to the central entity 12.

The central entity 12 is preferably a fixed entity having a central computational facility. The central entity 12 is in communication with remote entities 14 within respective geographical regions. A central entity may include, but is not limited to, OnStar® which is a subscription-based communications service currently offered on vehicles manufactured by General Motors that provides services that include, but are not limited to, in-vehicle security, remote diagnostics systems, and turn-by-turn navigation via a vehicle-based communication unit that provides a wireless communication link between the vehicle and the remote infrastructure. Alternatively, an ad-hoc wireless communication network other than OnStar may be utilized.

The central entity 12 includes a transmitter 16 and a receiver 18 for communicating with the remote entities 14. The central entity 12 further includes a processor 20 that requests data from the remote entities 14 and analyzes the data for determining various types of conditions or events occurring in the geographical region that the central entity 12 is sampling therefrom. Such conditions or events may include, but are not limited to, traffic congestion, weather-related conditions, and road conditions. The central entity 12 may include memory for storing the data retrieved from the remote entities 14 for further analysis. The processor 20 further includes an algorithm which analyzes the data and determines not only the type of condition being sought, but determines the number of entities that will be queried from a respective region.

The remote entities 14 include a transmitter 22, a receiver 24, and sensing devices 26. The transmitter 22 and receiver 24 are used to receive queries and transmit data when requested. It should be understood that while a respective remote entity may constantly sense for a respective condition, the respective entity will only transmit the data if the respective remote entity is queried by the central entity 12. If the query is not intended for the respective remote entity, the respective remote entity will not transmit a message.

The sensing devices 26 sense for respective information in their geographical region and transmit the information to the central entity 12. The remote entities 12 may further include a global positioning device so that its position can be identified and provided to the central entity 12. The central entity 12 can then determine the location of each remote entity and determine whether a respective remote entity should be a part of a respective query. The remote entities 14 may further include memory for storing data that is obtained by the sensing devices.

Figure 2:
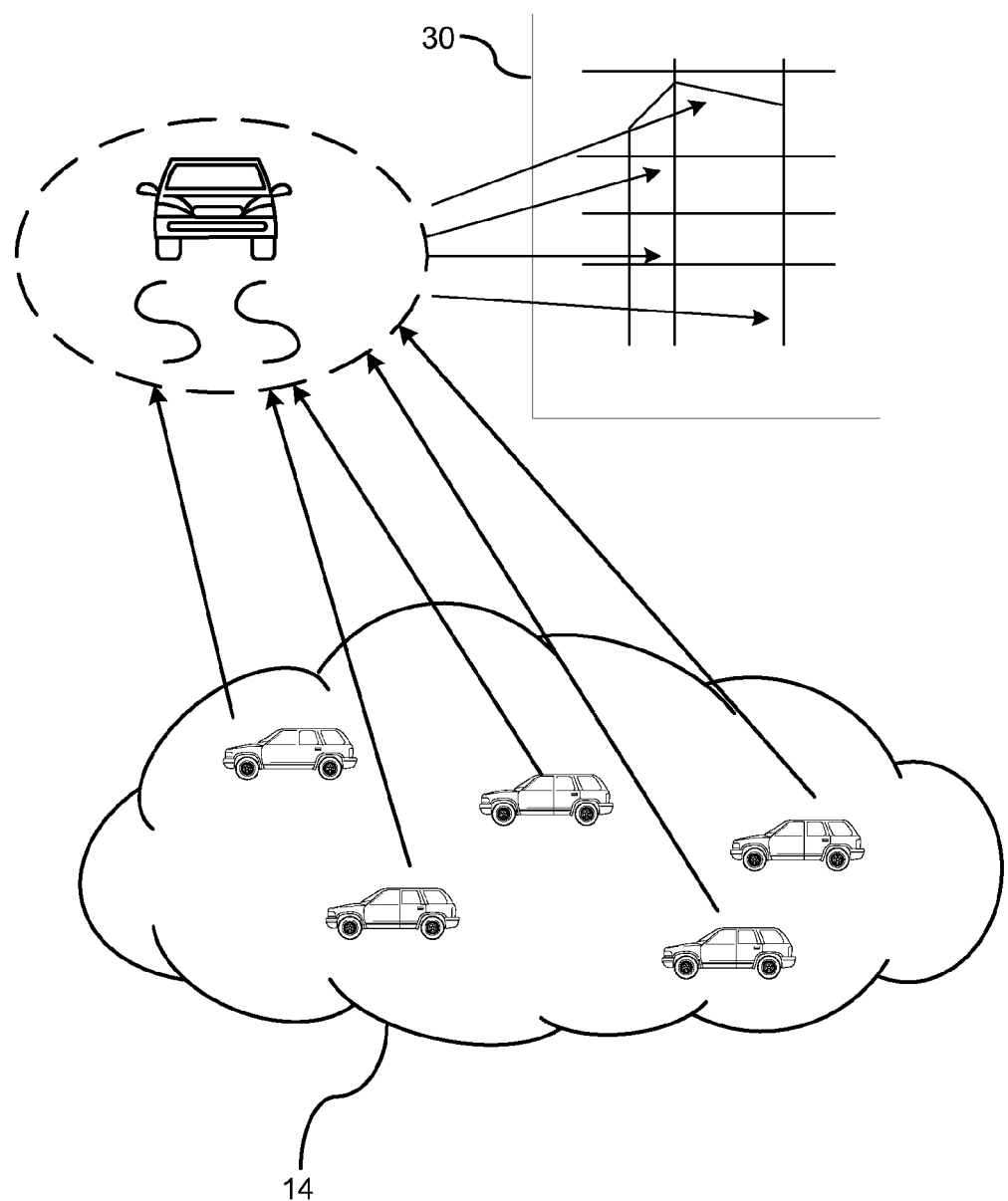
FIG. 2 is a pictorial concept illustration of a remote entity query process.

FIG. 2 illustrates a pictorial concept of the remote entity query process. Each of the remote entities 14 identifies its geographical position utilizing GPS or other locating techniques. Each remote entity 14 is located at a respective location in the geographical region as illustrated in the exemplary map 30. If the central entity is requesting road surface conditions, those respective remote entities queried will identify the road surface condition in their respective region and transmit the road surface information to the central entity for processing. As a result, the central entity can analyze the information relating to the road surface conditions and generate environmental awareness condition messages or other potential hazard messages to other remote entities traveling in those respective regions. To minimize the amount of communication activity over the communication medium, the central entity queries only a selected number of remote entities for transmitting the data. If the central entity (after processing the data) determines that the data provided by each of the queried vehicles is accurate, then the central entity may lessen the number of remote entities queried in the next query based on a confidence level that the information is sufficiently accurate. If however data between remote entities is different enough such that the accuracy of the data is in question, the central entity may increase the number of remote entities queried in the next query. As a result, the central entity selectively and adaptively adjusts the number of remote entities queried based on the similarity or difference in data received by each of the remote entities, and also on a comparison of the data received between a current query and a previous query.

Figure 3:
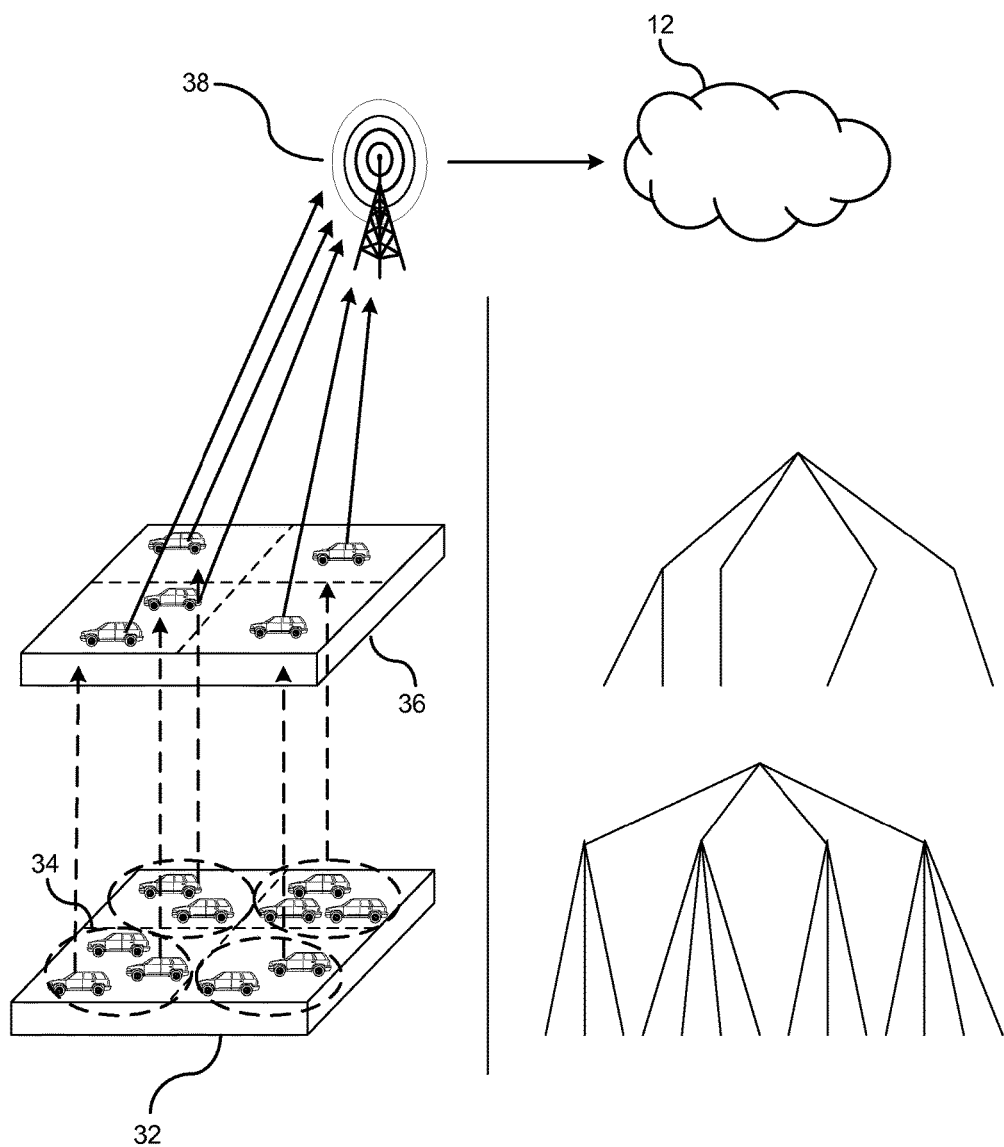
FIG. 3 illustrates a pictorial illustration of the process of reducing data transmitted on the communication medium.

FIG. 3 illustrates a pictorial illustration of how the data transmitted on the communication medium is reduced. Element 32 represents a population in a geographical region. The geographical region is partitioned into quadrants 34. It should be understood that the partitioning of the geographical regions may be separated in regions other than quadrants as illustrated (e.g., the quadrant sizes may vary based on vehicle density or areas may be defined based on road shape). Within each quadrant, one or more vehicles are selected for the query. The selection of vehicles for query is shown at element 36. Once the respective vehicles are identified and notified of their selection for the query, each of the queried vehicles transmits the requested to data to the central entity 12 via wireless communication 38 where the data is then received by the central entity 12 and the data is processed for determining the conditions requested (e.g., environmental conditions). The figures to the right of elements 32 and 36 represent a selection tree process illustrating the downsizing of the vehicles transmitting the data from an entire population to a sample size of the population.

Figure 4:
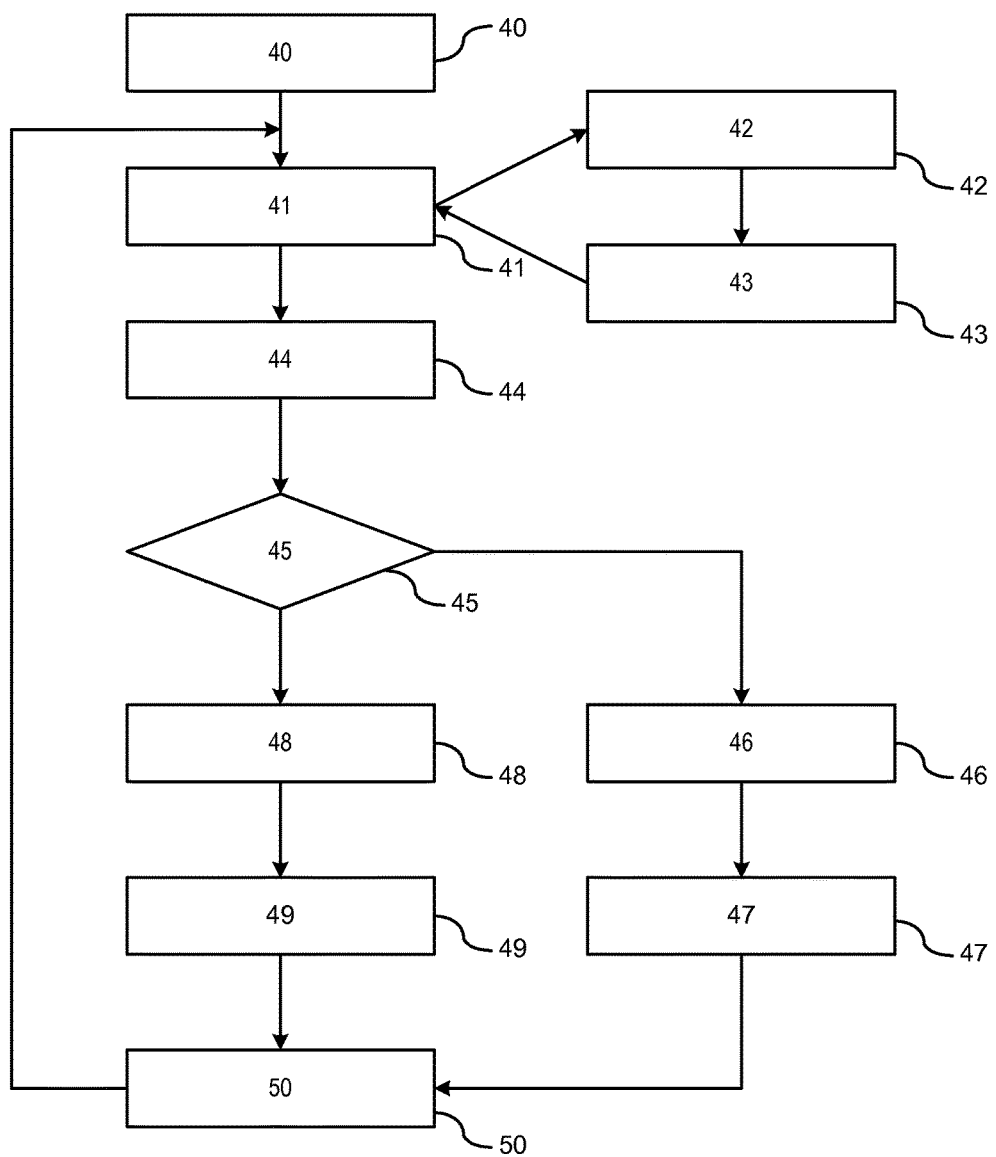
FIG. 4 is a flowchart of a method for selectively adjusting the number of samples queried by the central entity.

FIG. 4 illustrates a flowchart of a method for selectively adjusting the number of samples queried by the central entity.

In step 40, a geographical region is identified and the geographical region is subdivided. The division of the geographical region may be divided equally (e.g., quadrants as shown in FIG. 3) or unequally. Each respective subdivided region includes a sampling of the entire population of the geographical region that is capable of being queried.

In step 41, a respective number of samples are selected from each respective subdivided region. The respective number of samples is between a maximum number and a minimum number and is represented by the following equation:

$$n_{min} \leq n \leq n_{max}.$$

In block 42, for each query, n samples are randomized from the entire population in the each region. That is, randomizing the samples in each region provides for an unbiased sampling of entities within each of the regions so that a particular remote entity is not targeted each query.

In block 43, each of the samples is periodically rotated for work balancing. Periodically rotating the samples includes removing samples from potential selection in the current sampling period that were queried in a previous sampling period from. This prevents a same entity from being sampled consecutively. It should be understood that the central entity may exclude an entity from being sampled in a current period that was previously sampled in one of a predetermined number of previous sampling periods.

In block 44, the central entity analyzes the content of the data and calculates a statistical value of the data $\overline{X}_t$ for the current time interval [T−1, T]. The statistical value may include, but is not limited to, an average value, mean value, or medium value.

In block 45, a decision is made as to whether a difference between the average value for the current time interval and the average value for the previous time interval is greater than a predetermined percentage (or delta) of the average value for the previous time interval. The decision block determines whether the current data sampled deviates significantly from the previous data sampled by a predetermined percentage (or delta). If a determination is made that a significant deviation has occurred, then more samples may be required for determining whether current data is accurate. If a determination is made that current data and previous data are not deviated beyond the threshold, then the number of samples may be reduced since the previous data and the current data is in conformity with one another. As a result, the amount of data sampled may be reduced, which minimizes the data transmitted on the bandwidth.

Referring to block 45, if the determination is made that the difference between the average value for the current time interval and the average value for the previous time interval is greater than a predetermined percentage of the average value for the previous time interval, then a determination is made to adjust the number of samples by decreasing the number of samples. The routine proceeds to the step 46. Alternatively, if the difference between the average value for the current time interval and the average value for the previous time interval is less than a predetermined percentage of the average value for the previous time interval, then a determination is made to adjust the number of samples by increasing the number of samples. The routine proceeds to the step 48.

In block 46, number of samples is decreased by a respective number. This value, which is specified by a domain expert who provides a value that ensures the system converges to a stable state within the required amount of time, is responsive in dynamic sensing environments and does not oscillate unnecessarily. This would be defined as a calibration value and the increment/decrement value could also dynamically changes based on the application.

In block 47, a determination is made whether to utilize the adjusted number determined in step 46 or a predetermined maximum number. The determination of which sample number to select is determined by the following formula:

$$n = \min(n_{max}, n)$$

where min $(n_{max}, n)$ is the minimum number of either $n_{max}$ or the adjusted number n decremented in step 46.

The routine proceeds to step 50 where the current number sample n is updated.

Referring again to block 45, if the determination is made that the difference between the average value for the current time interval and the average value for the previous time interval is less than a predetermined percentage of the average value for the previous time interval, then a determination is made to adjust the number of samples by increasing the number of samples and the routine proceeds to the step 48.

In step 48, the number of samples is increased by a respective number as set forth by the domain expert.

In block 49, a determination is made whether to utilize the adjusted number determined in step 48 or a predetermined minimum number. The determination of which sample number to select is determined by the following formula:

$$n = \max(n_{min}, n)$$

where max $(n_{min}, n)$ is the maximum number of either $n_{min}$ or the adjusted number n determined in step 48.

The routine proceeds to step 50 where the current number sample n is updated.

The routine proceeds to step 41 to query the remote entities based on the number of samples as identified in step 50. As a result, this technique adaptively adjusts the sample size to reduce the data transmitted on the communication bandwidth if the deviation between sampling periods is not significant, and increase the data transmitted on the communication bandwidth if the deviation between the sampling periods is significant.

While certain embodiments of the present invention have been described in detail, those familiar with the art to which this invention relates will recognize various alternative designs and embodiments for practicing the invention as defined by the following claims.

What is claimed is:

1. A method of adaptively controlling a sampling size for crowd sensing applications, the method comprising the steps of:
   (a) identifying a plurality of geographic regions for obtaining sample data, wherein the identified plurality of geographic regions are divided into a plurality of subdivided regions, and each of the plurality of subdivided regions includes a sampling of an entire population of the geographical region that is capable of being queried;
   (b) identifying, by a central entity including a processor, a respective number of remote entities to sample within each geographical region during a current time interval, wherein each of the remote entities is a vehicle, and the vehicle includes at least one sensing device;
   (c) obtaining sample data from each of the respective remote entities identified in step (b), wherein the sampled data is at least one of traffic condition data, weather condition data, and road condition data, the sampled data is produced by the at least one sensing device of the vehicle, each of the remote entities constantly senses to obtain the sample data, and obtaining the sample data from each of the respective remote entities further includes:
   transmitting a query requesting data from the central entity to each of the respective remote entities identified in step (b); and
   each of the queried remote entities transmitting data to the central entity in response to the query, wherein only the queried remote entities transmit data to the central entity;
   (d) determining, by the central entity, a statistical value for the sampled data;
   (e) determining whether a difference between the statistical value for the current time interval and a statistical value for a previous time interval is greater than by a predetermined threshold;
   (f) increasing the respective number of remote entities sampled in the regions in response to the difference being greater than the predetermined threshold; otherwise, decreasing the respective number of remote entities sampled in the regions in response to the difference being less than the predetermined threshold; and
   (g) repeating steps (b)-(e) utilizing the respective number of entities to sample as identified in step (f).

2. The method of claim 1 wherein the identified plurality of geographic regions are divided into quadrants such that each of the plurality of subdivided regions is one of the quadrants, and identifying, by the central entity, a respective number of remote entities to sample within each geographical region during the current time interval includes selecting, within each of the quadrants, one or more vehicles for the query.

3. The method of claim 1 wherein each respective remote entity queried is randomly selected from an entire population in each geographical region such that a particular remote entity of the plurality of remote entities is not targeted each query.

4. The method of claim 3 wherein available remote entities from which to sample from is rotated periodically to prevent a same entity of the plurality of entities from being sampled consecutively.

5. The method of claim 3 wherein a respective remote entity interrogated in a previous sampling period is removed from a next sampling period.

6. The method of claim 1 wherein the predetermined threshold identified in step (b) is a function of a predetermined percentage of the previous average value for the previous time interval.

7. The method of claim 6 wherein the decision for determining whether the difference is greater than the predetermined threshold is represented by the following formula:

$$|X_T - X_{T-1}| \geq \alpha |X_{T-1}|$$

where $X_T$ is the average value of the data received from the queried entities at the current time interval, $X_{T-1}$ is the average value of the data received from the queried entities at the previous time interval, and $\alpha$ is a predetermined percentage.

8. The method of claim 1 wherein in response to decreasing the number sample, the number sample is selected from the minimum of either an upper threshold or the decreased number sample.

9. The method of claim 1 wherein in response to increasing the number sample, the number sample is selected from the maximum of either a lower threshold or the decreased number sample.

10. The method of claim 1 wherein in the statistical value is an average value.

11. The method of claim 1 wherein the statistical value is determined by the central entity.

12. A crowd sensing system comprising:
a central entity including a processor, transmitter, and receiver identifying a plurality of geographic regions for obtaining sample data;
a plurality of remote entities located in the plurality of geographical regions, the remote entities including a transmitter and receiver receiving queries from the central entity, only the queried remote entities transmitting data to the central entity in response to the query, each of the plurality of remote entities is a vehicle, and the vehicle including at least one sensing device;
wherein the central entity divides the plurality of geographical regions into a plurality of subdivided regions, and each of the plurality of subdivided regions includes a sampling of an entire population of the geographical region that is capable of being queried, the central entity identifies a respective number of remote entities within each region to obtain sample data, wherein sample data is obtained from each of the identified remote entities, wherein the sampled data is at least one of traffic condition data, road condition data, and weather condition data, the sample data is produced by the at least one sensing device of the vehicle, each of the plurality of remote entities constantly senses to obtain the sample data, the central entity determines a statistical value for the sampled data, wherein the central entity determines whether a difference between the statistical value for the current time interval and a statistical value for a previous time interval is greater than a predetermined threshold, wherein the respective number of remote entities sampled in the region are increased in response to the difference being greater than the predetermined threshold; otherwise, decreasing the respective number of samples identified from the region in response to the difference being less than the predetermined threshold; and wherein the central entity queries a number of remote entities in the plurality of regions equal to the adjusted number of samples identified by the central entity during a next time interval.

13. The method of claim 12 wherein the central entity obtaining sample data from each of the respective remote entities further comprises: the central entity transmitting a query requesting data from the central entity to each of the identified remote entities; and the queried entities transmitting data to a central entity in response to the query.

14. The system of claim 13 wherein the remote entities queried by the central entity are randomly selected from an entire population in each geographical region.

15. The system of claim 14 wherein available remote entities from which to sample from within each region is rotated periodically to prevent a same entity of the plurality of entities from being sampled consecutively.

16. The system of claim 14 wherein a respective remote entity queried in a previous sampling period is removed from a next sampling period.

17. The system of claim 12 wherein the predetermined threshold is a function of a predetermined percentage of the previous average value for a previous time interval.

18. The system of claim 17 wherein a decision for determining whether the difference is greater than the predetermined threshold is represented by the following formula:

$$|X_T - X_{T-1}| \geq \alpha |X_{T-1}|$$

where $X_T$ is the average value of the data received from the queried remote entities at the current time interval, $X_{T-1}$ is the average value of the data received from the queried remote entities at the previous time interval, and $\alpha$ is a predetermined percentage.

19. The system of claim 12 wherein in response to decreasing the number of remote entities sampled, the central entity selects the number of remote entities sampled from the minimum of either an upper threshold and the decreased number sample.

20. The system of claim 12 wherein in response to increasing the number of remote entities sampled, the central entity selects the number of remote entities sampled from the maximum of either a lower threshold and the increased number sample.

* * * * *